(12) United States Patent
Farricker et al.

(10) Patent No.: US 7,940,791 B2
(45) Date of Patent: May 10, 2011

(54) ROUTER FOR ESTABLISHING CONNECTIVITY BETWEEN A CLIENT DEVICE AND ON-BOARD SYSTEMS OF AN AIRPLANE

(75) Inventors: James T Farricker, North Bend, WA (US); Garry Gean Herzberg, Renton, WA (US); Paul S Stout, Tacoma, WA (US); Joshua A Taylor, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 653 days.

(21) Appl. No.: 11/535,617

(22) Filed: Sep. 27, 2006

(65) Prior Publication Data
US 2008/0075090 A1   Mar. 27, 2008

(51) Int. Cl.
*H04L 12/66* (2006.01)
*G06F 15/16* (2006.01)

(52) U.S. Cl. .................. 370/463; 709/203; 709/227

(58) Field of Classification Search ............ None
See application file for complete search history.

(56) References Cited

U.S. PATENT DOCUMENTS

| | | | |
|---|---|---|---|
| 6,427,944 B1 | 8/2002 | Passman | |
| 6,850,497 B1 * | 2/2005 | Sigler et al. | 370/310 |
| 7,177,939 B2 * | 2/2007 | Nelson et al. | 709/230 |
| 7,756,145 B2 * | 7/2010 | Kettering et al. | 370/401 |
| 2002/0046262 A1 * | 4/2002 | Heilig et al. | 709/219 |
| 2002/0160773 A1 * | 10/2002 | Gresham et al. | 455/431 |
| 2003/0185207 A1 * | 10/2003 | Nakahara | 370/389 |
| 2004/0098745 A1 * | 5/2004 | Marston et al. | 725/73 |
| 2004/0235469 A1 * | 11/2004 | Krug | 455/431 |
| 2005/0021860 A1 * | 1/2005 | Kelly et al. | 709/246 |
| 2006/0168090 A1 * | 7/2006 | Loda et al. | 709/208 |
| 2007/0115938 A1 * | 5/2007 | Conzachi et al. | 370/352 |
| 2007/0127460 A1 * | 6/2007 | Wilber et al. | 370/389 |
| 2008/0086554 A1 | 4/2008 | Royalty | |
| 2008/0086637 A1 | 4/2008 | Royalty | |

FOREIGN PATENT DOCUMENTS

| | | |
|---|---|---|
| EP | 1017188 | 7/2000 |
| WO | 03021866 | 3/2003 |

OTHER PUBLICATIONS

The Boeing Company, PCT/US2007/016174, mailed Mar. 3, 2008.

* cited by examiner

*Primary Examiner* — Gregory B Sefcheck
(74) *Attorney, Agent, or Firm* — Klintworth & Rozenblat IP LLC

(57) ABSTRACT

A system and method for establishing connectivity between a client device and an on-board computer network of an airplane are provided. The client device is connected for establishing communication with a network such as an enterprise intranet associated with the airplane. A virtual private network is created for establishing communication between a router and the client device. The client device is connected with an on-board server of the airplane via the router while maintaining connectivity between the personal computer and the network.

21 Claims, 3 Drawing Sheets

ROUTER FOR ESTABLISHING CONNECTIVITY BETWEEN A CLIENT DEVICE AND ON-BOARD SYSTEMS OF AN AIRPLANE

BACKGROUND OF THE INVENTION

Modern aircraft employ various on-board computer systems for performing a wide variety of operations such as avionics, maintenance functions and the like. On-board networks for many airplanes use private re-usable transmission control protocol/internet protocol (TCP/IP) addresses. These TCP/IP addresses (such as Request for Comment (RFC) 1917/1918) may not be routable in many internal enterprise computing networks. Additionally, on-board maintenance servers for certain aircraft networks (such as those utilizing an X-windows platform) may require the same source TCP/IP address to be retained throughout a network connectivity session. Disadvantageously, this precludes the ability to support Network Address Translation (NAT) since NAT requires changes to TCP/IP addresses during translation.

Moreover, the physical architecture for many airplane on-board computer systems has limits to the number of physical Ethernet ports that may be used for network connectivity. Further, in certain circumstances, each airplane is addressed with identical private TCP/IP addresses. Thus, this does not allow for a scalable, repeatable network design that provides connectivity to multiple airplanes, for example, in a factory or flight-test environment. Due to these limits in the physical architecture, a maintenance control unit (such as one implemented in a personal computer) may not be able to communicate with an airplane on-board maintenance server while also having connectivity with a separate secure internal network, such as the enterprise network for the airplane manufacturer. A communication method and system is needed which may solve one or more problems in existing airplane communication networks.

SUMMARY

A system and method are provided for establishing connectivity between a client device and an on-board computer network of an airplane. A client device is connected for communication with a network such as an intranet. A virtual private network is created and establishes communication between a router and the client device. A communication path is established between the router and a closed data network of the avionic core architecture associated with the airplane. The client device is connected with an on-board server of the airplane via the router while maintaining connectivity between the client device and the network.

DETAILED DESCRIPTION

Figure 1:
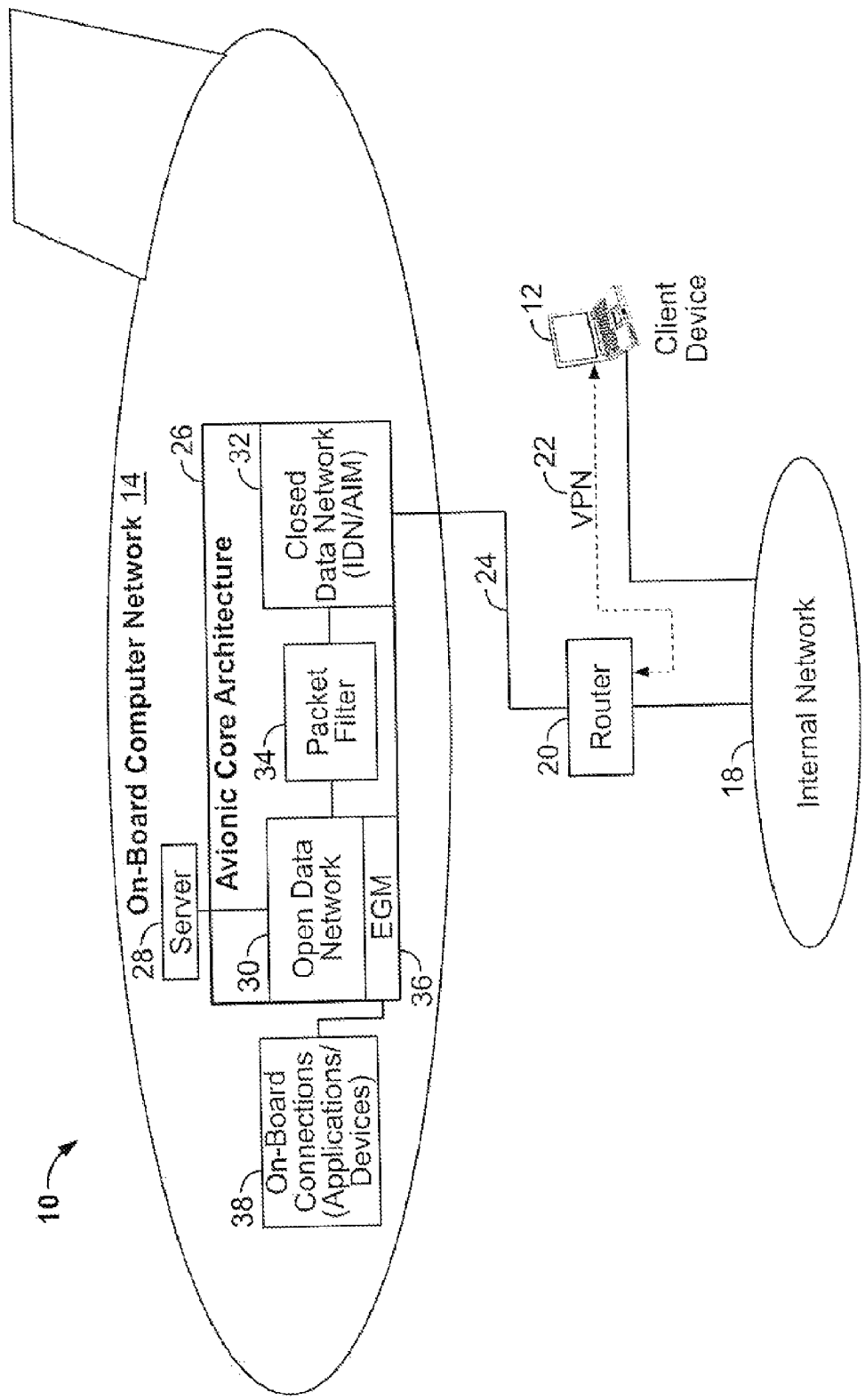
FIG. 1 depicts a system diagram utilizing a router for providing a client device with connectivity to an airplane on-board computer network.

A system and method for establishing connectivity between a client device and an on-board computer network of an airplane are provided. A client device is connected for communication with a network such as an enterprise network associated with the airplane. A virtual private network (VPN) is created and establishes communication between a router and the client device. A communication path is established between the router and a closed data network of the avionic core architecture associated with the airplane. The client device is connected with an on-board server of the airplane via the router while maintaining connectivity between the client device and the internal network. The network, for instance, may be an internal network such as an intranet; however, client connectivity may also be achieved with external networks such as the Internet, an airport network, a factory network or any other communication network.

A configuration procedure is applied to the router to allow connectivity of the client device with the airplane on-board computer network as well as with the secure internal network. An Ethernet interface of the router is connected to the internal network and an Internet Protocol (IP) address of the internal network is identified. The router is then connected to the on-board computer network of the airplane. The virtual private network associated with the client device and the router is configured with the IP address obtained from the internal network. The system, for example, may employ a communication application based on X-windows protocol such that source and destination TCP/IP addresses are maintained during the connection. The configuration allows the router to establish a VPN connection to maintain client connectivity with the internal network and NAT (to private TCP/IP addresses) while also being connected to the on-board computer network of the airplane.

In addition to creating a virtual private network between the router and the client device, a communication path is established between the router (on the airplane side) and the avionic core architecture of the on-board computer network of the airplane. In this example, the avionic core architecture includes an open data network and a closed data network (such as an isolated data network (IDN) having an avionics interface module (AIM)). The communication path is established between the router and the closed data network. Data received from the router at the closed data network is sent to the open data network for communication with the on-board server at the airplane. The client device may for example be a maintenance control unit that is used to interact with the on-board server (such as a maintenance server) to perform maintenance analysis functions or to load software to the on-board computer network. These operations are performed by the maintenance control unit communicating with the airplane avionic core architecture via the router while also simultaneously being in communication with the secure internal enterprising network.

As provided herein, the use of the configured router allows the client device to terminate a client VPN tunnel to the router, then a point-to-point protocol (PPP) tunnel is established to the closed data network which allows the source TCP/IP address (on the airplane side) to be maintained for the connectivity session. The router may, for example, be operable in the Dynamic Host Configuration Protocol (DHCP) or static TCP/IP addressed environments. As an example, multiple routers may be connected to multiple airplanes in factory/flight line/maintenance/modification or upgrade environments. The client device is configured to allow it to terminate a client VPN connection on the router. In one example, the client device may be a Windows XP-based device and the router may selectively be configured to run advanced services IP Internet Operating System (IOS) software. The router is also configured as a VPN server to terminate VPN client connections as well as forward client data packets to the on-board computer network.

Referring now to FIG. 1, system 10 is shown for providing connectivity between client device 12 and on-board computer network 14 of airplane 16. Client device 12 is also in communication with network 18, such as an internal network. Internal network 18 may selectively be any intranet, such as, for example, an enterprise network and, in particular, an enterprise network relating to the manufacture, maintenance or operation of the airplane 16. Alternatively, network 18 may be an external network such as the Internet, an airport network, a factory network or any other communication network. Router 20 is operably adapted to communicate with the client device 12 over a virtual private network (VPN) 22. A communication path 24 is established between the router 20 and avionic core architecture 26 of the on-board computer network 14 of the airplane 16. The client device 12 is able to be connected to and communicate with an on-board server 28 of the on-board computer network 14 via the router while connectivity is also maintained between the client device and the internal network 18.

As seen in FIG. 1, the avionic core architecture 26 of the on-board computer network 26, in this example, includes open data network 30 and closed data network 32. The open data network 30 and the closed data network 32 are two physical networks of the avionic core architecture 26. The open data network 30, in this example, may be implemented on a network device that provides port-based virtual local area networks (VLANs) supporting Open Systems Interconnection (OSI) layer 2 switch functions between ports. The open data network 30, in this example, may also provide OSI layer 3 routing functions between the VLANs. The open data network 30 may provide a number of individual software-configurable networks with policy routing between them. The closed data network 32 may, for example, include an isolated data network (IDN) having an avionics interface module (AIM). The IDN is implemented on a network device (separate from the open data network) and supports OSI layer 2 switch functions for all ports. The IDN may include a boundary router providing functionality for OSI layer 3 routing and policy enforcement (e.g., firewall) for data transferred between the open data network and the closed data network. The AIM, for example, may provide the network functionality that implements the IDN, and IDN boundary router or an avionics gateway. Management of network devices for AIM may be provided by means of data loadable software and configuration files.

The open data network 30 is coupled with the on-board server 28. The on-board server may, for example, be any computer-based server that operates as part of the airplane on-board computer network and communicates with an external client device. For instance, the on-board server 28 may selectively be a maintenance server that interacts via the avionic core architecture 26 and the router 20 with the client device 12. The client device 12 may, for example, be a personal computer or any computer-based device that communicates with the on-board server. For instance, the client device may selectively be employed as a maintenance control unit that interacts with the on-board server to perform maintenance analysis functions or to download software to the on-board computer network 14 while also maintaining communication with the secure internal network 18. In this example, the maintenance control unit may be a computing device (such as a personal computer or laptop device) used to diagnose, repair, and test airplane systems. The maintenance control unit may be used in a line maintenance environment and may alternatively be used in base maintenance. Connectivity to the on-board computer network 14 may be performed with the maintenance control unit in a wired or wireless mode.

The client device 12 communicates with the router 20 over the VPN 22. A communication path 24 is also established between the router 20 and the closed data network 32 of the avionic core architecture 26. Data received from the router 20 at the closed data network 32 is sent to the open data network 30 for communication with the on-board server 14. Packet filter 34 is employed in filtering and sending data from the closed data network 32 to the open data network 30. The packet filter 34 is an OSI layer 3 routing device, statically configured, and capable of filtering inbound traffic on either the open data network or closed data network interfaces 30, 32. As seen in FIG. 1, Ethernet gateway module (EGM) 36 is implemented on the open data network 30, and provides the physical ports to on-board connections 38 such as connections with various network applications or devices of the on-board computer network 14. For instance, wireless interface devices, satellite connections or other devices or network applications may be connected with the open data network 30 through EGM 36. The EGM 36, for example, may be a core network module in a dedicated slot. The EGM 36 may provide routing for airplane information networking. The EGM 36 may also provide transport services to off-board network interfaces for devices attached to the open data network 30 and devices in other networks on the airplane. The EGM 36 may allocate ports for VLANs and route data between VLANs.

To provide connectivity of the client device 12 with the on-board computer network 14 while also maintaining communication with the secure internal network 18, a configuration procedure is provided to the router 20. Initially, the router 20 is powered on with no router interfaces connected to the closed data network 32 or other networks. The router 20 fully activates before physically connecting with the avionic core architecture 32. An Ethernet interface of the router 20 is connected to the internal network 18 and an Internet Protocol (IP) address is obtained from the internal network. The router 20 is connected to the on-board computer network 14 at the closed data network 32. The VPN 22 associated with the client device 12 and the router 20 is configured using the IP address obtained from the internal network 18. The client device 12 may, for example, be a personal computer or laptop computer running software supporting TCP/IP based services for file transfer protocol (FTP), e-mail, hypertext transfer protocol (HTTP) or the like for communication with the internal network 18 and the on-board computer network 14.

Figure 2:
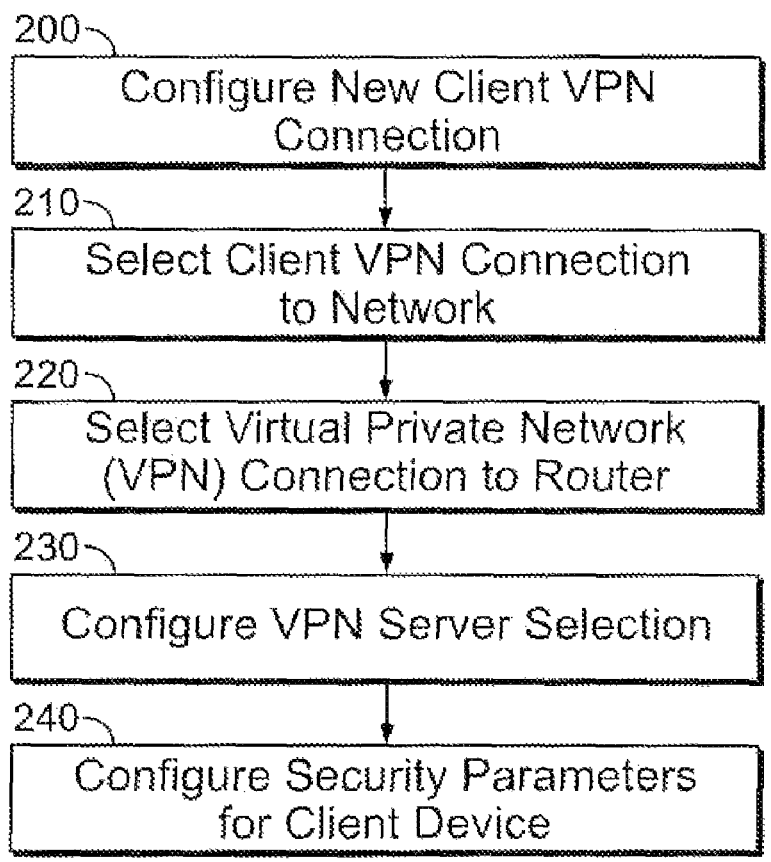
FIG. 2 is a flow diagram for configuration of a client device.

Referring now to FIG. 2, a flow diagram for a configuration procedure for the client device 12 is shown. The client device 12, for example, may run an operating system software such as Windows XP Professional software provided by Microsoft Corporation. The configuration is performed by user operation with user interface devices (e.g. mouse, keypad, display screen) at the client device for interaction with the system software. The configuration of the client device 12 allows the client device to establish a VPN connection with the router 20 (that is also used for routing purposes) and to maintain connectivity with the internal network 18 while also having connectivity with the airplane on-board computer network 14. In step 200, configuration of a new client VPN network connection is performed with the system software. The network connections is selected from the icons presented in the control panel at the client device 12. In this example, the "new connection wizard" option is selected from the network connections. In step 210, a connect to the network option is selected from the connection types presented at the client device 12. A VPN connection (to router 20) is selected for the network connection in step 220. In step 230, a VPN server selection parameter is provided as part of the client device configuration. In particular, an IP address of the Ethernet port on the internal network 18 side for the router 20 is inputted at the client device 12 for selection of the VPN server (router 20 functions as a VPN server). In step 240, advanced security parameters associated with the VPN connection are configured at the client device 12.

Figure 3:
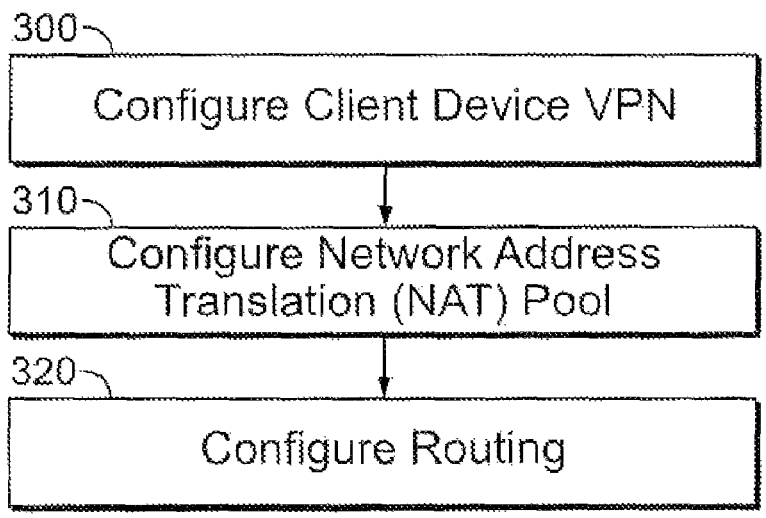
FIG. 3 is a flow diagram for configuration of a router device.

Referring now to FIG. 3, a flow diagram for an example configuration of the router 20 is shown. The router 20, in this example, may be provided with routing software that supports VPN client device termination and Network Address Translation (NAT) overload. The configuration allows the router 20 to establish a VPN connection to maintain intranet connectivity to the client device 12 and NAT (to private TCP/IP address space) while also maintaining connectivity to the airplane avionic core architecture 32. In step 300, configuration of the VPN on router 20 should match the client VPN set-up as defined in steps 200-230, FIG. 2. In step 310, FIG. 3, configuration of the NAT pool is performed, in particular, to the closed data network interface 32 of the airplane. This provides the assignment of virtual addresses to one or more client devices 12 to use when accessing the on-board computer network 14. In step 320, route maps are configured at the router 20 to provide network visibility.

Figure 4:
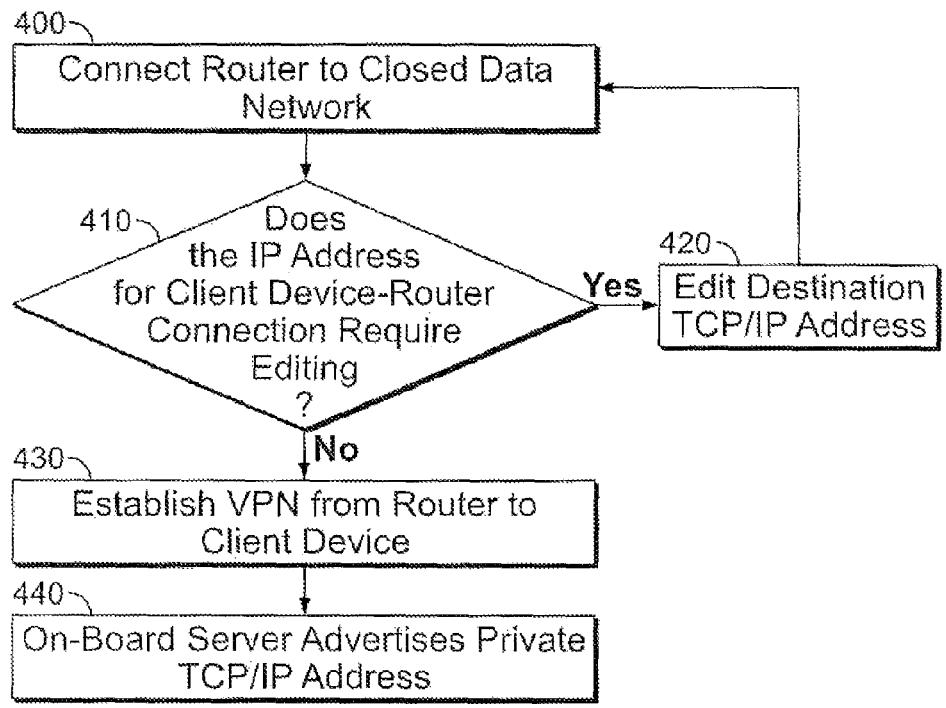
FIG. 4 is a flow diagram illustrating operation and execution at the router device.

Referring now to FIG. 4, a flow diagram illustrating the operation and execution at the router 20 is provided. The router 20 employed, for example, is preferably a pre-onfigured router. If the router 20 has not been pre-configured, it may be configured as seen with reference to FIG. 3. A completed power cycle of the configured router 20 (with appropriate operating system software) is commenced before communication operation at the router. In step 400, connection of the router 20 to the closed data network 32 of the avionic core architecture is performed. For example, connection of a physical Ethernet interface for the router 20 is connected to an AIM or IDN Ethernet port of the closed data network 32. In step 410, a user determines if editing is needed for the IP address associated with the VPN connection for the router 20 and client device 12. If a change to the router/client device connection is desired, then in step 420 the destination TCP/IP address is edited. This may be performed through selection of properties on the router 20 VPN client session. (See steps 200, 300, FIGS. 2, 3.) The process flow then returns to step 400. If the client device 12 connection to the router 20 does not require editing, then in step 430 a VPN from router 20 to client device 12 via internal network 18 is established. For example, a user ID and password may be entered at the client device 12 to start the VPN connection with the router 20. In step 440, the on-board server 28 advertises a private TCP/IP address through an Ethernet port of the closed data network 32. For instance, the IP address associated with the server 28 may be advertised through the avionic core architecture 26 via the open data network 30 to the closed data network 32 through the router packet filter 34.

Figure 5:
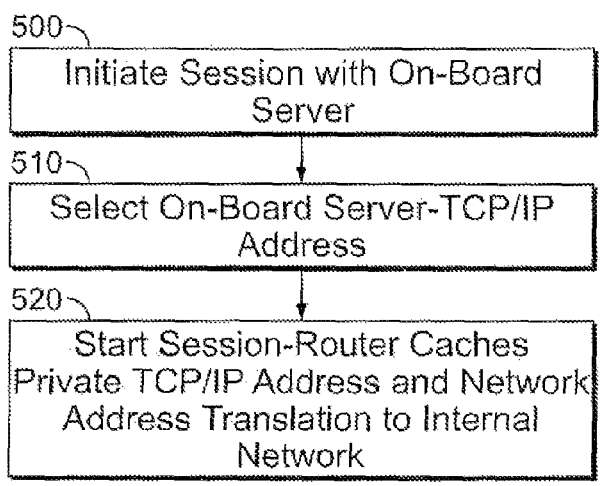
FIG. 5 is a flow diagram illustrating operation and execution at the client device.

Referring to FIG. 5, a flow diagram illustrating an example of operation and execution at the client device 12 is provided. In step 500, an appropriate menu selection at the client device 12 may be performed to initiate a communication session with the on-board server 28. As an example, a session may be started with an on-board maintenance server application. The client device 12, in step 510, makes the appropriate selection of the on-board server 28 by selecting the TCP/IP address of the server as defined through the router 20. In step 520, to begin a communication session, the client device 12 utilizes a virtual address (from the pool provided by the router 20) and the router 20 caches a private TCP/IP address for the on-board server 28 and network address translation to the internal network 10.

The foregoing description of the preferred embodiments of the invention have been presented for purposes of illustration and description, and are not intended to be exhaustive or to limit the invention the precise forms disclosed. The descriptions were selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method of establishing connectivity between an off-board client device and an on-board computer network of an airplane comprising:
   connecting the off-board client device with at least one of an internal network or an external network and initiating, using the off-board client device, a communication session with an on-board server of the airplane connected to a closed on-board data network behind an avionics interface module of the airplane;
   creating a virtual private network for establishing communication between a router and the off-board client device; and
   connecting the off-board client device with the on-board server of the airplane via the router while maintaining connectivity between the off-board client device and the at least one internal network or external network, and with the closed on-board data network behind the avionics interface module of the airplane.

2. The method of claim 1 further comprising establishing a communication path between the router and an avionic core architecture of the on-board computer network of the airplane.

3. The method of claim 2 wherein the avionic core architecture comprises an open data network and the closed on-board data network and wherein the communication path is established between the router and the closed on-board data network.

4. The method of claim 3 wherein the closed on-board data network comprises an isolated data network accessible only to airplane avionics modules comprising an avionics gateway.

5. The method of claim 3 further comprising sending data received from the router at the closed on-board data network to the open data network for communication with the on-board server of the airplane.

6. The method of claim 1 wherein the off-board client device is connected with the external network, and the external network comprises at least one of: (a) an Internet; (b) an airport network; or (c) a factory network.

7. The method of claim 1 wherein the off-board client device is connected with the internal network, the internal network is an enterprise network, and the off-board client device communicates with the enterprise network.

8. The method of claim 7 wherein the off-board client device is a maintenance control unit and further comprising utilizing the maintenance control unit to interact with the on-board server to perform maintenance analysis functions or loading of software while in communication with at least one of the enterprise network, a factory network, an internet, or an airport network.

9. The method of claim 1 wherein the off-board client device is connected with the internal network and further comprising connecting an Ethernet interface of the router to the internal network;
  identifying an Internet Protocol (IP) address of the internal network;
  connecting the router to the on-board computer network of the airplane; and
  configuring the virtual private network associated with the off-board client device and the router with the IP address obtained from the internal network.

10. The method of claim 1 wherein the on-board server of the airplane is X-windows based.

11. A system for establishing connectivity between an off-board client device and an on-board computer network of an airplane comprising:
  a router adapted to communicate with the off-board client device through a virtual private network;
  said off-board client device for initiating a communication session with an on-board server of the airplane connected to a closed on-board data network behind an avionics interface module of the airplane and for communicating with at least one of an internal network or an external network; and
  said off-board client device for connecting with the on-board server of the airplane via the router while maintaining connectivity between the off-board client device and the at least one internal network or external network, and with the closed on-board data network behind the avionics interface module of the airplane.

12. The system of claim 11 further comprising a communication path established between the router and avionic core architecture of the on-board computer network of the airplane.

13. The system of claim 12 wherein the avionic core architecture comprises an open data network and the closed on-board data network and wherein the communication path is established between the router and the closed on-board data network.

14. The system of claim 13 wherein the closed on-board data network comprises an isolated data network accessible only to airplane avionics modules comprising an avionics gateway.

15. The system of claim 13 wherein the closed on-board data network sends data received from the router to the open data network for communication with the on-board server.

16. The system of claim 11 wherein the off-board client device communicates with the external network, and the external network comprises at least one of: (a) an Internet; (b) an airport network; or (c) a factory network.

17. The system of claim 11 wherein the off-board client device communicates with the internal network, and the internal network is an enterprise network.

18. The system of claim 17 wherein the off-board client device is a maintenance control unit adapted to interact with the on-board server to perform maintenance analysis functions or loading of software while in communication with at least one of the enterprise network, a factory network, an internet, or an airport network.

19. The system of claim 11 wherein the off-board client device communicates with the internal network, an Ethernet interface of the router is connected to the internal network, and an Internet Protocol (IP) address is obtained from the internal network.

20. The system of claim 19 wherein the router is connected to the on-board computer network of the airplane and the virtual private network associated with the off-board client device and the router is configured using the IP address obtained from the internal network.

21. The system of claim 11 wherein the on-board server of the airplane is X-windows based.

* * * * *